(12) United States Patent
Raghavan et al.

(10) Patent No.: US 6,422,969 B1
(45) Date of Patent: Jul. 23, 2002

(54) POWERTRAIN WITH A SIX SPEED PLANETARY TRANSMISSION HAVING THREE PLANETARY GEAR SETS

(75) Inventors: Madhusudan Raghavan, West Bloomfield; Patrick Benedict Usoro, Troy, both of MI (US)

(73) Assignee: General Motors Corporation, Detroit, MI (US)

( * ) Notice: Subject to any disclaimer, the term of this patent is extended or adjusted under 35 U.S.C. 154(b) by 8 days.

(21) Appl. No.: 09/638,007

(22) Filed: Aug. 14, 2000

(51) Int. Cl.[7] ................................................. F16H 3/62
(52) U.S. Cl. ..................................................... 475/276
(58) Field of Search ......................................... 475/276

(56) References Cited

U.S. PATENT DOCUMENTS

| | | | |
|---|---|---|---|
| 3,282,131 A | * 11/1966 | Smith | 475/276 |
| 4,004,473 A | * 1/1977 | Pearce et al. | 475/276 |
| 5,989,148 A | * 11/1999 | Park | 475/276 |

* cited by examiner

Primary Examiner—Dirk Wright (74) Attorney, Agent, or Firm—Jeffrey A. Sedlar; George A. Grove (57) ABSTRACT

A powertrain has a prime mover and a final drive gearing interconnected by a planetary gear arrangement including three planetary gear sets and five torque transmitting mechanisms. The planetary gear sets each have three rotatable members. Two members of a first of the planetary gear sets are continuously interconnected respectively with members of a second of the planetary gear sets. One of the interconnected pairs is continuously connected with the prime mover. The third member of the second planetary gear set is continuously connected with one member of the third of the planetary gear sets. Another member of the third planetary gear set is continuously connected with the final drive gearing. Three of the torque transmitting mechanisms are operatively connected between the planetary gear sets and a transmission housing to selectively restrain rotation of selected members of the three planetary gear sets. The fourth of the torque transmitting mechanisms is an interconnecting mechanism that connects at least the prime mover and one member of the first planetary gear set with an otherwise unconnected member of the third planetary gear set. The fifth torque transmitting mechanism is selectively connectable between either one member of the first planetary gear set or the one interconnected members of the first and second planetary gear sets and either the output shaft or the otherwise unconnected member of the third planetary gear set.

17 Claims, 5 Drawing Sheets

FIG. 1

| | RATIOS | 28 | 30 | 32 | 24 | 26 |
|---|---|---|---|---|---|---|
| REVERSE | -3.46 | X | | X | | |
| NEUTRAL | 0 | | | X | | |
| 1 | 3.94 | | | X | | X |
| 2 | 2.05 | | X | | | X |
| 3 | 1.33 | X | | | | X |
| 4 | 1 | | | | X | X |
| 5 | 0.78 | X | | | X | |
| 6 | 0.64 | | X | | X | |

(X = ENGAGED CLUTCH)

N1 = 2.0, N2 = 2.2, N3 = 1.78

| Ratio Spread | 6.15 |
|---|---|
| Ratio Steps | |
| REV/1 | -0.87 |
| 1/2 | 1.91 |
| 2/3 | 1.54 |
| 3/4 | 1.33 |
| 4/5 | 1.27 |
| 5/6 | 1.22 |

| | RATIOS | 124 | 126 | 128 | 120 | 122 |
|---|---|---|---|---|---|---|
| REVERSE | -2.87 | X | | X | | |
| NEUTRAL | 0 | | | X | | |
| 1 | 4.14 | | | X | | X |
| 2 | 2.4 | | X | | | X |
| 3 | 1.5 | X | | | | X |
| 4 | 1 | | | | X | X |
| 5 | 0.68 | X | | | X | |
| 6 | 0.55 | | X | | X | |

(X = ENGAGED CLUTCH)

$N1 = 2.0, N2 = 1.71, N3 = 1.81$

| Ratio Spread | 7.5 |
|---|---|
| Ratio Steps | |
| REV/1 | -0.69 |
| 1/2 | 1.72 |
| 2/3 | 1.6 |
| 3/4 | 1.5 |
| 4/5 | 1.46 |
| 5/6 | 1.23 |

| | RATIOS | 210 | 212 | 214 | 216 | 218 |
|---|---|---|---|---|---|---|
| REVERSE | -2.68 | X | | | | X |
| NEUTRAL | 0 | | | | | X |
| 1 | 2.88 | | X | | | X |
| 2 | 1.58 | | | X | | X |
| 3 | 1 | | | | X | X |
| 4 | 0.69 | | | X | X | |
| 5 | 0.55 | | X | | X | |
| 6 | 0.37 | X | | | X | |

(X = ENGAGED CLUTCH)

$N1 = 2.09, N2 = 2.72, N3 = 2.23$

| Ratio Spread | 7.69 |
|---|---|
| Ratio Steps | |
| REV/1 | -0.93 |
| 1/2 | 1.82 |
| 2/3 | 1.58 |
| 3/4 | 1.44 |
| 4/5 | 1.23 |
| 5/6 | 1.48 |

| | RATIOS | 310 | 312 | 314 | 316 | 318 |
|---|---|---|---|---|---|---|
| REVERSE | -2.65 | | X | | | X |
| NEUTRAL | 0 | | X | | | |
| 1 | 3.04 | | X | | X | |
| 2 | 2.02 | | | | X | X |
| 3 | 1.32 | | | X | X | |
| 4 | 1 | | | | X | X |
| 5 | 0.68 | X | | | X | |
| 6 | 0.5 | X | | | | X |

(X = ENGAGED CLUTCH)

N1 = 1.69, N2 = 1.89, N3 = 1.97

| Ratio Spread | 5.97 |
|---|---|
| Ratio Steps | |
| REV/1 | -0.87 |
| 1/2 | 1.49 |
| 2/3 | 1.52 |
| 3/4 | 1.32 |
| 4/5 | 1.46 |
| 5/6 | 1.33 |

| | RATIOS | 410 | 412 | 414 | 416 | 418 |
|---|---|---|---|---|---|---|
| REVERSE | -1.9 | | | X | | X |
| NEUTRAL | 0 | | | X | | |
| 1 | 3.22 | | | X | X | |
| 2 | 2.3 | | X | | | X |
| 3 | 1.34 | | X | | X | |
| 4 | 1 | | | | X | X |
| 5 | 0.67 | X | | | X | |
| 6 | 0.48 | X | | | | X |

(X = ENGAGED CLUTCH)

N1 = 1.88, N2 = 1.70, N3 = 2.22

| Ratio Spread | 6.67 |
|---|---|
| Ratio Steps | - |
| REV/1 | -0.59 |
| 1/2 | 1.4 |
| 2/3 | 1.71 |
| 3/4 | 1.34 |
| 4/5 | 1.48 |
| 5/6 | 1.39 |

POWERTRAIN WITH A SIX SPEED PLANETARY TRANSMISSION HAVING THREE PLANETARY GEAR SETS

TECHNICAL FIELD

This invention relates to powertrains having multi-speed transmissions and particularly to six speed planetary transmissions that include three planetary gear sets.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. One such transmission is disclosed in U.S. Pat. No. 4,070,927 issued to Polak on Jan. 31, 1978. The Polak transmission provides six forward speed ratios. Six speed transmissions offer several advantages over four speed transmissions, including improved vehicle acceleration and improved fuel economy. However, passenger cars still employ three and four speed automatic transmissions with a few five speed devices due to the size and complexity of six speed transmissions.

SUMMARY OF THE INVENTION

It is an object of the present invention to provide an improved six speed planetary transmission.

In one aspect of the present invention, the transmission has minimum mechanical content including three planetary gear sets. In another aspect of the present invention, the transmission has five torque transmitting mechanisms in the form of selectively engageable, fluid-operated clutches and brakes. In yet another aspect of the present invention, the transmission employs two clutches and three brakes.

In still another aspect of the present invention, the transmissions output shaft is continuously connected for common rotation with one member of one of the planetary gear sets and the input shaft is continuously connected for common rotation with at least one member of another of the planetary gear sets. In a further aspect of the present invention, two gear members of the first planetary gear set are continuously interconnected with two gear members of the second planetary gear set. In a yet further aspect of the present invention, a third gear member of the second planetary gear set and one gear member of the third planetary gear set are continuously interconnected for common rotation.

The present invention is comprised of a family of transmissions having three planetary gear sets. The planetary gear sets may be either of the simple type or the compound type. Each planetary gear set has three gear members, namely, a sun gear member, a ring gear member, and a planet carrier gear member. A first member and a second member, respectively, of each of the first and second of the planetary gear sets are interconnected for continuous common rotation, and a third member of the second of the planetary gear sets and a member of the third of the planetary gear sets are interconnected for common rotation. At least one member of one of the planetary gear sets is continuously connected with an input shaft for common rotation therewith, and at least one member of one of the planetary gear sets is continuously connected with an output shaft for common rotation therewith.

The transmission includes five selectively engageable, fluid-operated torque transmitting mechanisms, two of which are rotating torque transmitting mechanisms (clutches) and three of which are stationary torque transmitting mechanisms (brakes). The torque transmitting mechanisms are interconnected with the planetary gear sets to establish six forward ratios and one reverse ratio. One of the rotating torque transmitting mechanisms is operable to provide an input drive connection, and the other rotating torque transmitting mechanism is operable to provide either a gear member to gear member interconnection or an output drive connection.

DESCRIPTION OF EXEMPLARY EMBODIMENTS

A powertrain 10 (FIG. 1) includes a conventional engine and torque converter 12, a planetary gear arrangement 14, and a conventional final drive gearing 16. The torque converter can be replaced with any of the well-known starting mechanisms. The final drive gearing can incorporate a differential gearing. The planetary gearing arrangement 14 includes three planetary gear sets 18, 20, and 22 and five torque transmitting mechanisms 24, 26, 28, 30, and 32 which are conventional fluid-operated, selectively engageable devices. The torque transmitting mechanisms 24 and 26 are rotating type torque transmitting mechanisms commonly termed clutches, and the torque transmitting mechanisms 28, 30, and 32 are stationary type torque transmitting mechanisms commonly termed brakes or stationary clutches. The torque transmitting mechanisms are controlled by a conventional electro-hydraulic control system, not shown, that includes an electronic control unit (ECU) having a programmable digital computer included therewith. The control system establishes the engagement of each of the torque transmitting mechanisms and the ratio interchange or shift schedule in a well-known manner.

Figure 1:
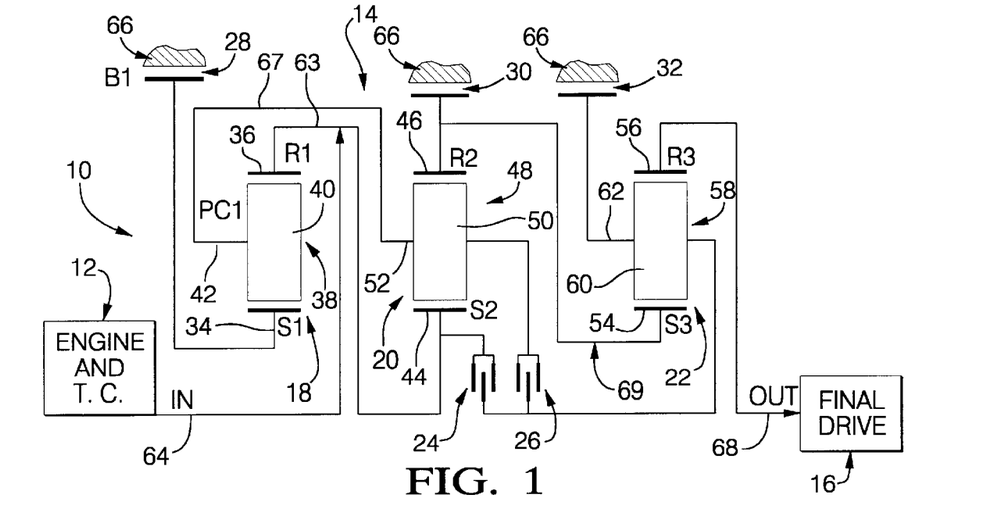
FIG. 1 is a schematic representation of a powertrain incorporating the present invention.

The planetary gear sets 18, 20 and 22 are all of the simple planetary type. The planetary gear set 18 has a sun gear member 34, a ring gear member 36 and a planet carrier assembly member 38 that includes a plurality of pinion gears members 40 rotatably mounted on a carrier 42 and meshing with both the sun gear member 34 and the ring gear member 36. The planetary gear set 20 has a sun gear member 44, a ring gear member 46 and a planet carrier assembly member 48 that includes a plurality of pinion gear members 50 rotatably mounted on a carrier 52 and meshing with both the sun gear member 44 and the ring gear member 46. The planetary gear set 22 has a sun gear member 54, a ring gear member 56 and a planet carrier assembly member 58 that includes a plurality of pinion gear members 60 rotatably mounted on a carrier 62 and meshing with both the sun gear member 54 and the ring gear member 56.

The ring gear member 36 and sun gear member 44 are interconnected by a connection 63 and are continuously drivingly connected with an input shaft 64, which is continuously connected with the engine and torque converter 12. The sun gear member 34 is operatively connectable with a stationary housing 66 through the torque transmitting mechanism 28. The planet carrier assembly member 38 is continuously connected with the planet carrier assembly member 48 through a connection 67. The sun gear member 44 and ring gear member 36 are operatively connectable with the planet carrier assembly member 58 through the torque transmitting mechanism 24. The planet carrier assembly member 38 and the planet carrier assembly member 48 are operatively connectable with the planet carrier assembly member 58 through the torque transmitting mechanism 26. The ring gear member 46 is continuously connected, through a connection 69, with the sun gear member 54, both of which are selectively connectable with the stationary housing 66 through the torque transmitting mechanism 30. The planet carrier assembly member 58 is selectively connectable with the stationary housing 66 through the torque transmitting mechanism 32. It should be noted that the engagement of both of the torque transmitting mechanisms 26 and 32 will result in the planet carrier assembly members 38, 48 and 58 being held stationary. The ring gear member 56 is continuously drivingly connected with an output shaft 68 that is continuously connected with the final drive 16.

As described above, the planetary gear sets 18 and 20 each have two members thereof connected with members of the other. The planet carrier assembly members 38 and 48 are interconnected, and the ring gear member 36 and sun gear member 44 are interconnected. The planetary gear sets 20 and 22 each have one member thereof interconnected, namely, the ring gear member 46 and sun gear member 54. The input shaft 64 is continuously connected with at least one member of one of the planetary gear sets, namely, ring gear member 36 or sun gear member 44. The output shaft 68 is continuously connected with a member of one of the planetary gear sets, namely, ring gear member 56. One of the rotating torque transmitting mechanisms, namely, torque transmitting mechanism 26, provides a selectable interconnection between interconnected members (planet carrier assembly members 38 and 48) of the planetary gear sets 18 and 20 and a member (planet carrier assembly member 58) of the planetary gear set 22. The other torque transmitting mechanism, namely, torque transmitting mechanism 24, provides a selective connection between one gear member (planet carrier assembly member 58) and the input shaft 64.

Figure 2:
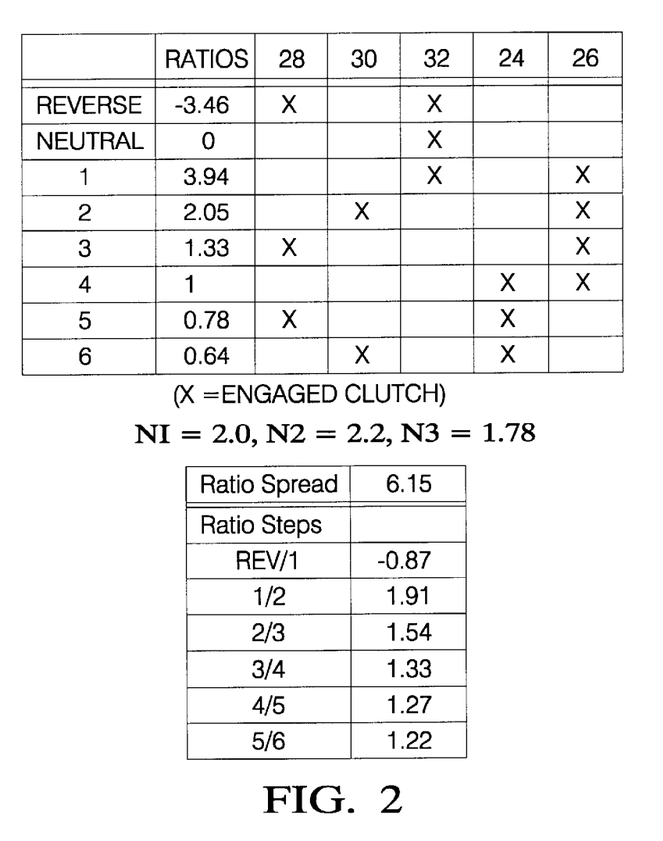
FIG. 2 is a truth table setting forth the interchange schedule for the torque transmitting mechanisms of the powertrain shown in FIG. 1.

The truth table of FIG. 2 describes the engagement schedule for the torque transmitting mechanisms 24, 26, 28, 30 and 32 during the establishment of six forward drive ratios, a reverse drive ratio and a neutral condition. During the following analysis of the drive ratios, the speed of the input shaft is considered to be unity and the other members of the planetary gear sets and the output shaft will be rotated either faster, slower or equal to unity depending on the planetary action that is initiated.

To establish the reverse drive ratio, the torque transmitting mechanisms 28 and 32 are engaged. This establishes both the sun gear member 34 and the planet carrier assembly member 58 as reaction members in the planetary gear arrangement 14. The ring gear member 36 and the sun gear member 44 are input members. The reverse drive ratio is determined by the tooth ratios of the planetary gear set 18, the planetary gear set 20, and the planetary gear set 22. During the reverse drive ratio, the planet carrier assembly member 38 is driven forwardly at a reduced ratio as is the planet carrier assembly member 48 which is connected therewith resulting in the ring gear member 46 and the sun gear member 54 being driven forwardly at a reduced ratio. Since the planet carrier assembly member 58 is stationary, the ring gear member 56 and the output shaft 68 will be driven in reverse (opposite to the input shaft). The reverse ratio is determined by the tooth ratios (N1, N2 and N3 in FIG. 2) of all three of the planetary gear sets 18, 20 and 22. The neutral condition is established when none of the torque transmitting mechanisms is engaged or when only the torque transmitting mechanism 32 is engaged. When the torque transmitting mechanism 32 is engaged, the ratio interchange between the reverse drive ratio and the first forward drive ratio requires only the swapping of the torque transmitting mechanisms 26 and 28.

To establish the first forward drive ratio, the torque transmitting mechanisms 32 and 26 are engaged. The planet carrier assembly member 58 remains the reaction member and the planet carrier assembly member 48 becomes a reaction member due to the connection created by the torque transmitting mechanism 26. The sun gear member 44 is the input member. The ring gear member 46 and the sun gear member 54 are driven in reverse, at a reduced ratio, resulting in the ring gear member 56 being driven forwardly at a reduced ratio. The first forward drive ratio is determined by the tooth ratios (N2 and N3 in FIG. 2) of the planetary gear sets 20 and 22.

To establish the second forward drive ratio, the torque transmitting mechanisms 32 and 30 are interchanged and the torque transmitting mechanism 26 remains engaged. The ring gear member 46 and the sun gear member 54 are connected to the housing 66 and therefore are reaction members in the planetary gear arrangement 14. The sun gear member 44 is the input member which results in the planet carrier assembly member 48 and the planet carrier assembly member 58 being driven forwardly at a reduced speed determined by the tooth ratio of the planetary gear set 20. The ring gear member 56 and the output shaft 68 are driven forwardly at a reduced speed determined by the tooth ratio of the planetary gear set 22. With judicious selection of the tooth ratios of the planetary gear sets 18, 20 and 22, the second forward ratio will be an underdrive ratio determined by the tooth ratios (N2, N3) of the planetary gear sets 20 and 22.

To establish the third forward ratio, the torque transmitting mechanisms 30 and 28 are interchanged and the torque transmitting mechanism 26 remains engaged. The sun gear member 34 becomes the reaction member and the ring gear member 36 and the sun gear member 44 are input members. The planet carrier assembly member 38 and the planet carrier assembly member 58 are driven forwardly at a reduced ratio determined by the tooth ratio of the planetary gear set 18. The ring gear member 46 and the sun gear member 54 are driven in reverse at a reduced ratio determined by the tooth ratio of the planetary gear sets 20 and 18. The ring gear member 56 and the output shaft 68 will be driven forwardly at a reduced speed determined by the tooth ratios (N1, N2 and N3) of the planetary gear sets 18, 20 and 22.

To establish the fourth forward drive ratio, the torque transmitting mechanisms 28 and 24 are interchanged and the torque transmitting mechanism 26 remains engaged. The torque transmitting mechanisms 26 and 24 interconnect the sun gear member 44 and planet carrier assembly member 48, thereby establishing a one-to-one ratio in the planetary gear set 20. The sun gear member 54 will rotate at engine speed due to the connection with ring gear member 46 and the planet carrier assembly member 58 will rotate at engine speed due to the connection with the planet carrier assembly member 48 and sun gear member 44. Therefore, the planetary gear set 22 is also in a one-to-one ratio resulting in a direct drive from the input shaft 64 to the output shaft 68.

To establish the fifth forward drive ratio, the torque transmitting mechanisms 26 and 28 are interchanged and the torque transmitting mechanism 24 remains engaged. The sun gear member 34 is a reaction member and the ring gear member 36, the sun gear member 44 and the planet carrier assembly member 58 are input members driven at the speed of the input shaft 64. The planet carrier assembly member 38 is driven forwardly at a reduced ratio determined by the tooth ratio (N1) of the planetary gear set 18. The ring gear member 46 and the sun gear member 54 are driven forwardly at a reduced ratio determined by the tooth ratios (N1, N2) of the planetary gear sets 18 and 20. The ring gear member 56 and the output shaft 68 are driven forwardly at an overdrive ratio determined by the tooth ratios (N1, N2 and N3) of the planetary gear sets 18, 20 and 22.

To establish the sixth forward speed ratio, the torque transmitting mechanisms 28 and 30 are interchanged and the torque transmitting mechanism 24 remains engaged. The sun gear member 54 is a reaction member and the planet carrier assembly member 58 is an input member driven at the speed of the input shaft 64. The ring gear member 56 and the output shaft 68 are driven forwardly at an overdrive ratio determined by the tooth ratio (N3) of the planetary gear set 22.

N1 in FIG. 2 is the tooth ratio of the ring gear member 36 to the sun gear member 34. N2 in FIG. 2 is the tooth ratio of the ring gear member 46 to the sun gear member 44. N3 in FIG. 2 is the tooth ratio of the ring gear member 56 to the sun gear member 54. It is evident from the truth table that each of the torque transmitting mechanisms 24, 26, 28, 30 and 32 are engaged in at least two of the drive ratios. The torque transmitting mechanism 26 is engaged during four consecutive forward drive ratios, and the torque transmitting mechanism 24 is engaged during three consecutive forward drive ratios. All of the single step shift sequences in the forward ratios are single transition interchanges. All of the double step shift ($1^{st}$ to $3^{rd}$, $2^{nd}$ to $4^{th}$, etc.) sequences in the forward ratios are single transition interchanges. The single transition interchanges simplifies the controls and produces a pleasant ride for the operator. It should also be noted in FIG. 2 that the ratio steps become progressively smaller as the gear ratios are sequenced from first to sixth.

Figure 3:
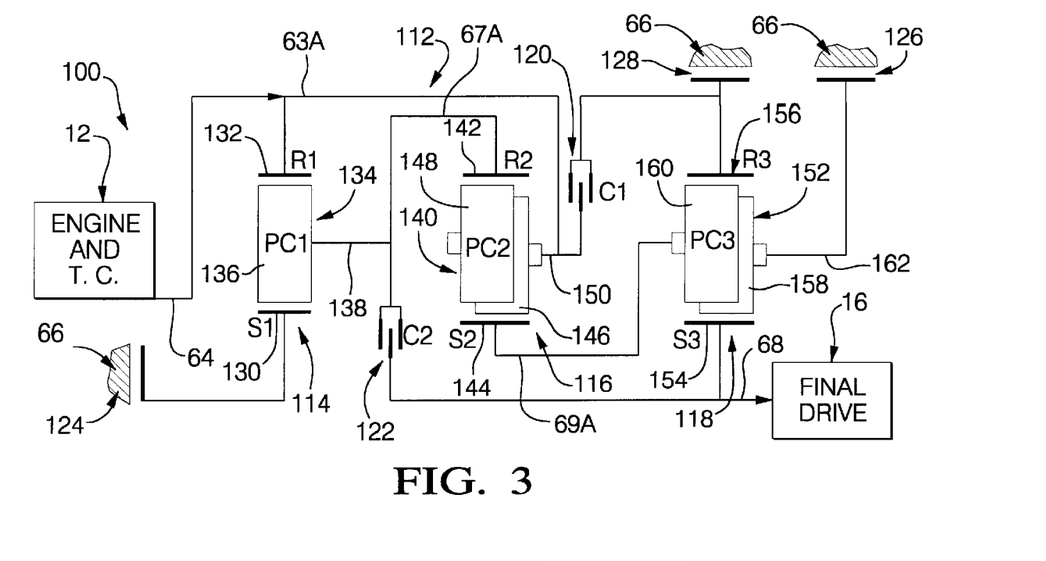
FIG. 3 is a schematic representation of another powertrain incorporating the present invention.

FIG. 3 depicts a powertrain 100 having a conventional engine and torque converter 12, a planetary gear arrangement 112, and a conventional final drive 16. The planetary gear arrangement 112 includes a simple planetary gear set 114, two compound planetary gear sets 116 and 118, two selectively engageable rotating torque transmitting mechanisms 120 and 122, and three selectively engageable stationary torque transmitting mechanisms 124, 126 and 128. The torque transmitting mechanisms 124, 126 and 128 are operatively connected with the transmission housing 66. The engine and torque converter 12 are continuously connected with the input shaft 64 which is operatively connected with the torque transmitting mechanism 120, and the final drive 16 is continuously connected with the output shaft 68 which is operatively connected with the torque transmitting mechanism 122.

The planetary gear set 114 includes a sun gear member 130, a ring gear member 132 and a planet carrier assembly member 134 having a plurality of pinion gears 136 rotatably mounted on a carrier 138 and meshing with both the sun gear member 130 and the ring gear member 132. The sun gear member 130 is operatively connected with the torque transmitting mechanism 124, the ring gear member 132 is continuously connected with the input shaft 64 and, through a connection 63A, with a planet carrier assembly member 140 and operatively connected with the torque transmitting mechanism 120, and the planet carrier assembly member 134 is continuously connected with a ring gear member 142, through a connection 67A, and operatively connected with the torque transmitting mechanism 122.

The planetary gear set 116 includes a sun gear member 144, the ring gear member 142, and the planet carrier assembly member 140 which has a plurality of intermeshing pinion gears 146 and 148 that are rotatably mounted on a carrier 150 and mesh respectively with the sun gear member 144 and the ring gear member 142. The sun gear member 144 is continuously connected, through a connection 69A, with a planet carrier assembly member 152 of the planetary gear set 118 and operatively connected with the torque transmitting mechanism 126.

The planetary gear set 118 includes a sun gear member 154, a ring gear member 156 and the planet carrier assembly member 152 which includes a plurality of intermeshing pinion gears 158 and 160 that are rotatably mounted on a carrier 162 and mesh respectively with the sun gear member 154 and the ring gear member 156. The sun gear member 154 is continuously connected with the output shaft 68. The ring gear member 156 is operatively connected with both torque transmitting mechanism 120 and torque transmitting mechanism 128.

Figure 4:
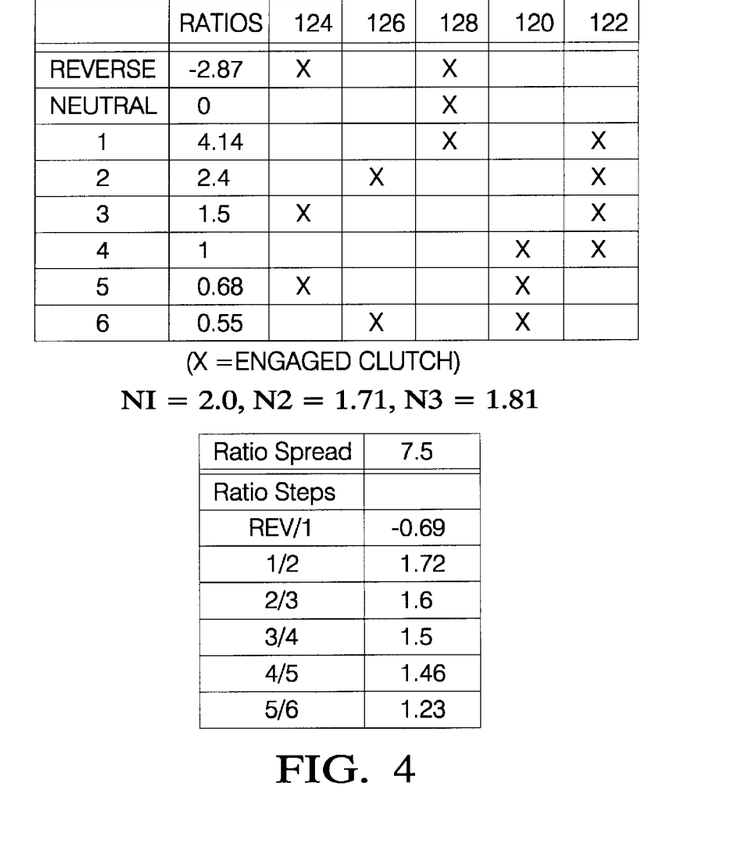
FIG. 4 is a truth table setting forth the interchange schedule for the torque transmitting mechanisms of the powertrain shown in FIG. 3.

The truth table of FIG. 4 describes the engagement activity necessary to establish the six forward drive ratios, the one reverse drive ratio, and the neutral condition as well as the shift interchange sequence for the planetary gear arrangement described in FIG. 3. The truth table also presents a set of drive ratios that can be provided by the planetary gear arrangement 112 if the given ring gear member to sun gear member ratios set forth therein are utilized. Furthermore, the ratio steps accompanying the shift interchange sequence are also presented.

To establish the reverse drive ratio, the torque transmitting mechanisms 124 and 128 are engaged to cause the sun gear member 130 and the ring gear member 156 to be held stationary to become reaction members. The planet carrier assembly member 140 is rotated forwardly at the speed of the input shaft 64, and the ring gear member 142 is rotated forwardly at a speed determined by the tooth ratio of the planetary gear set 114. The sun gear member 144 and the planet carrier assembly member 152 are driven forwardly at a ratio determined by the tooth ratios of the planetary gear sets 114 and 116 which results in the sun gear member 118 and the output shaft 68 being driven in reverse relative to the input shaft 64 at a ratio determined by the tooth ratio of the planetary gear set 118 and the speed of the planet carrier assembly member 152 which is determined by the planetary gear sets 114 and 116. Therefore, the reverse drive ratio is determined by the tooth ratios (N1, N2 and N3) of all three of planetary gear sets 114, 116 and 118.

The first forward drive ratio is established by the engagement of the torque transmitting mechanisms 122 and 128. The torque transmitting mechanism 128 can remain engaged as the transmission passes through or is held in the neutral condition. With the torque transmitting mechanism 128 engaged, the ring gear member 156 is a reaction member and the torque transmitting mechanism 122 connects the ring gear member 142 with the output shaft 68. The sun gear member 144 and the planet carrier assembly member 152 are rotated in reverse as rotating reaction members resulting in forward rotation of the sun gear member 154, ring gear member 142, planet carrier assembly member 134, and the output shaft 68 at a reduced speed relative to the input shaft 64. The first forward ratio is determined by the tooth ratios (N1, N2 and N3) of all three of the planetary gear sets 114, 116 and 118.

The second forward drive ratio is established by the substantially simultaneous interchange of the torque transmitting mechanisms 128 and 126. This will cause the planet carrier assembly member 152 and the sun gear member 144 to be held stationary and therefore reaction members. The planet carrier assembly member 140 is an input member and the ring gear member 142 is an output member due to the selective connection through the torque transmitting mechanism 122. The forward rotation of the planet carrier assembly member 140 results in the forward rotation of the ring gear member 142 and the output shaft 68 at a reduced speed relative to the input shaft determined by only the tooth ratio (N2) of the planetary gear set 116.

The third forward drive ratio is established by the interchange of the torque transmitting mechanisms 126 and 124 to set the sun gear member 130 as a reaction member. The planet carrier assembly member 134, due to the selective connection through torque transmitting mechanism 122, is the output member. The forward rotation of the ring gear member 132 results in forward rotation of the planet carrier assembly member 134 and output shaft 68 at a reduced speed relative to the input shaft 64 at a ratio determined by only the tooth ratio (N1) of the planetary gear set 114.

The fourth forward drive ratio is established by the interchange of the torque transmitting mechanisms 124 and 120. This effectively interconnects the three members of the planetary gear set 116 with three members of the planetary gear set 118 and also with the input shaft 64. This results in a direct drive from the input shaft 64 to the output shaft 68.

The fifth forward drive ratio is established by the interchange of the torque transmitting mechanisms 122 and 124 to establish the sun gear member 130 as a reaction member. The ring gear member 156 is driven forwardly at the speed of the input shaft 64 due to the selective connection through the torque transmitting mechanism 120. The planet carrier assembly member 136 and the ring gear member 142 are driven forwardly at a speed relative to the input shaft that is determined by the tooth ratio of the planetary gear set 114. The sun gear member 144 and the planet carrier assembly member 152 are driven forwardly at a reduced speed determined by the tooth ratio of the planetary gear set 116 and the relative speeds of the ring gear member 142 and the planet carrier assembly member 140. This will result in the sun gear member 154 and the output shaft 68 being driven forwardly at a speed greater than the speed of the input shaft. This is an overdrive ratio that is determined by the tooth ratios (N1, N2, and N3) of all three of the planetary gear sets 114, 116, and 118.

The sixth forward drive ratio is established by the interchange of the torque transmitting mechanisms 124 and 126 which results in the planet carrier assembly member 152 becoming a reaction member. The ring gear member 156 is an input member due to the selective connection with the input shaft 64 through the torque transmitting mechanism 120. With the ring gear member 156 being rotated by the input shaft 64 and the planet carrier assembly member 152 being held stationary, the sun gear member 154 and the output shaft 68 will rotate forwardly at an overdrive ratio relative to the input shaft 64. The sixth forward drive ratio is determined by the only tooth ratio (N3) of the planetary gear set 118.

N1 in FIG. 4 is the tooth ratio of the ring gear member 132 to the sun gear member 130. N2 in FIG. 4 is the tooth ratio of the ring gear member 142 to the sun gear member 144. N3 in FIG. 4 is the tooth ratio of the ring gear member 156 to the sun gear member 154. It is evident from the truth table that each of the torque transmitting mechanisms 120, 122, 124, 126, and 128 are engaged in at least two of the drive ratios. The torque transmitting mechanism 122 is engaged during four consecutive forward drive ratios, and the torque transmitting mechanism 120 is engaged during three consecutive forward drive ratios. All of the single step shift sequences in the forward ratios are single transition interchanges. All of the double step shift ($1^{st}$ to $3^{rd}$, $3^{rd}$ to $5^{th}$, $2^{nd}$ to $4^{th}$, etc.) sequences in the forward ratios are single transition interchanges. The single transition interchanges simplifies the controls and produces a pleasant ride for the operator. It should also be noted in FIG. 4 that the ratio steps become progressively smaller as the gear ratios are sequenced from first to sixth.

Figure 5:
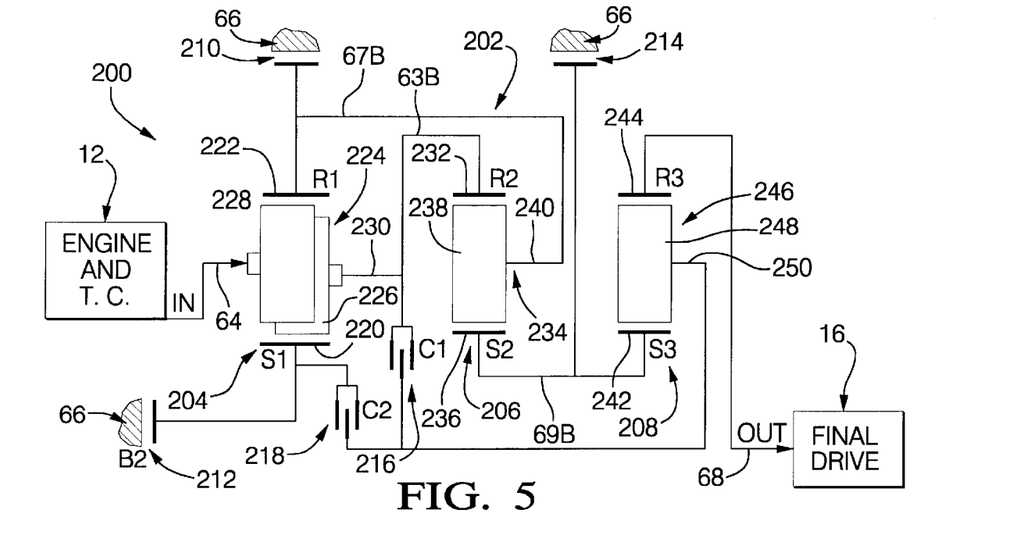
FIG. 5 is a schematic representation of yet another powertrain incorporating the present invention.

The powertrain 200, shown in FIG. 5, includes the engine and torque converter 12, the final drive 16 and a planetary gear arrangement 202. The planetary gear arrangement has one compound planetary gear set 204, two simple planetary gear sets 206 and 208, three stationary torque transmitting mechanisms 210, 212, and 214, and two rotating torque transmitting mechanisms 216 and 218.

The planetary gear set 204 has a sun gear member 220, a ring gear member 222 and a planet carrier assembly member 224 that includes a plurality of intermeshing pinion gear members 226 and 228 rotatably mounted on a carrier 230.

The pinion gear members 226 and 228 mesh with the sun gear member 220 and the ring gear member 222, respectively. The planet carrier assembly member 224 is continuously connected with the input shaft 64 and, through a connection 63B, with a ring gear member 232, and also operatively connected with the torque transmitting mechanism 216. The sun gear member 204 is operatively connected with the torque transmitting mechanisms 212 and 218. The ring gear member 222 is continuously connected with a planet carrier assembly member 234, through a connection 67B and also operatively connected with the torque transmitting mechanism 210.

The planetary gear set 206 includes the ring gear member 232, a sun gear member 236, and the planet carrier assembly member 234 that has a plurality of pinion gear members 238 rotatably mounted on a carrier 240 and meshing with the sun gear member 236 and the ring gear member 232. The sun gear member 236 is continuously connected, through a connection 69B, with a sun gear member 242 and operatively connected with the torque transmitting mechanism 214.

The planetary gear set 208 includes the sun gear member 242, a ring gear member 244 and a planet carrier assembly member 246 that has a plurality of pinion gear members 248 rotatably mounted on a carrier 250 and meshing with the sun gear member 242 and the ring gear member 244. The planet carrier assembly member 246 is operatively connected with the torque transmitting mechanisms 216 and 218. The ring gear member 244 is continuously connected with the output shaft 68.

The torque transmitting mechanisms 210, 212, 214, 216, and 218 are engaged in pairs to provide six forward drive ratios and one reverse drive ratio in the planetary gear arrangement 202 between the input shaft 64 and the output shaft 68. During these drive ratios, the planet carrier assembly member 224 and the ring gear member 232 are rotated by the input shaft 64 and the ring gear member 244 rotates with the output shaft 68. A neutral condition is established by disengaging all of the torque transmitting mechanisms or by engaging the torque transmitting mechanism 218 only.

Figure 6:
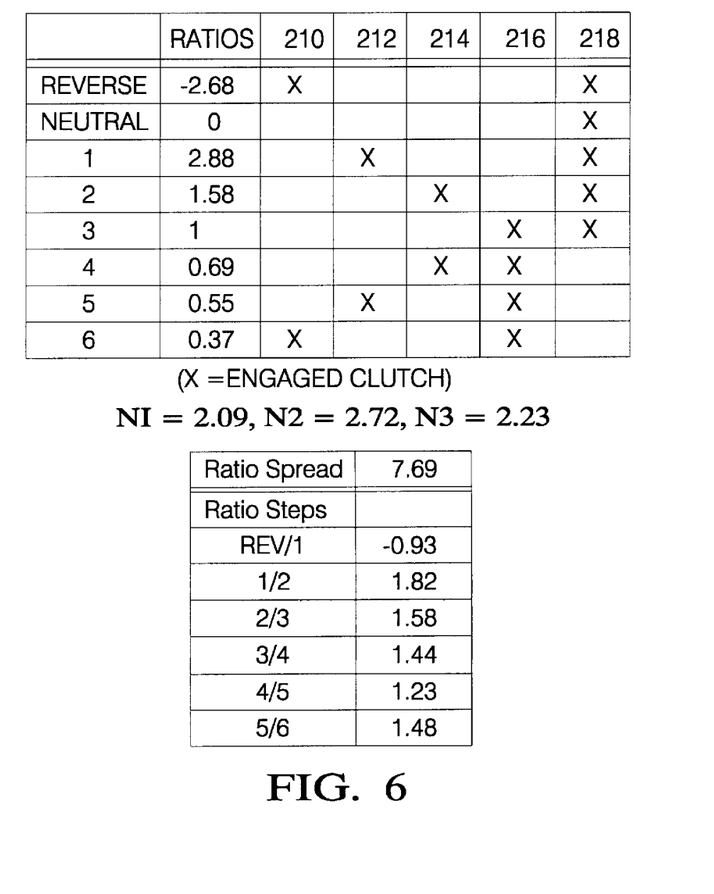
FIG. 6 is a truth table setting forth the interchange schedule for the torque transmitting mechanisms of the powertrain shown in FIG. 5.

The reverse drive ratio is established with the engagement of the torque transmitting mechanisms 210 and 218. This establishes the ring gear member 222 and the planet carrier assembly member 234 as reaction members. The sun gear member 220 and the planet carrier assembly member 246 are rotated in reverse at a speed determined by the tooth ratio of the planetary gear set 204. The sun gear members 236 and 242 are driven in reverse at a speed determined by the tooth ratio of the planetary gear set 206. The ring gear member 244 is driven in reverse at a speed determined by the speed of the sun gear member 242, the planet carrier assembly member 246 and the tooth ratio of the planetary gear set 208. The reverse drive ratio is determined by the tooth ratios (N1, N2, and N3) of the planetary gear sets 204, 206 and 208.

The first forward drive ratio is established by the engagement of the torque transmitting mechanisms 212 and 218. It should be noted that, as the planetary gear arrangement 202 passes through neutral, the torque transmitting mechanism 218 can remain engaged. The engagement of the torque transmitting mechanism 212 establishes both the sun gear member 220 and the planet carrier assembly member 246 as reaction members. The ring gear member 222 and the planet carrier assembly member 234 are driven forwardly at a speed determined by the tooth ratio of the planetary gear set 204. The sun gear member 236 is driven reversely at a speed determined by the speed of the ring gear member 232, the planet carrier assembly member 234 and the tooth ratio of the planetary gear set 206. The ring gear member 244 and the output shaft 68 are driven forwardly at a speed determined by the speed of the sun gear member 242 and the tooth ratio of the planetary gear set 208. The first forward drive ratio is determined by the tooth ratios (N1, N2, and N3) of the planetary gear sets 204, 206, and 208.

To establish the second forward drive ratio, the torque transmitting mechanisms 212 and 214 are interchanged in a single transition shift. This will establish the sun gear member 236 and the sun gear member 242 as reaction members. The planet carrier assembly member 224 and the ring gear member 232 are driven by the engine and torque converter 12. The planet carrier assembly member 234 and the ring gear member 222 are driven forwardly at a speed determined by the tooth ratio of the planetary gear set 206. The sun gear member 220 and the planet carrier assembly member 246 are driven forwardly at a speed determined by the speeds of planet carrier assembly member 224 (unity) and the ring gear member 222 (reduced) and the tooth ratio of the planetary gear set 204. The ring gear member 244 is driven forwardly at a speed determined by the speed of the planet carrier assembly member 246 and the tooth ratio of the planetary gear set 208. The second forward drive ratio is determined by the tooth ratios (N1, N2, and N3) of all three planetary gear sets 204, 206, and 208.

To establish the third forward drive ratio, the torque transmitting mechanisms 214 and 216 are interchanged in a single transition shift. The third forward drive ratio is a direct ratio (one to one). The planet carrier assembly member 224 and the sun gear member 220 of planetary gear set 204 are interconnected by the torque transmitting mechanisms 218 and 216 which results in a direct drive in planetary gear set 204. The ring gear member 232 and the planet carrier assembly member 234 are driven at engine speed due to the connection with the planetary gear set 204. The sun gear member 242, planet carrier assembly member 246 and therefore ring gear member 244 are driven at the speed of the input shaft 64 due to the connections with the planetary gear sets 204 and 206. Thus, the input shaft 64 and the output shaft 68 rotate at the same speed.

To establish the fourth forward drive ratio, the torque transmitting mechanisms 218 and 214 are interchange in a single transition shift. This establishes the sun gear member 236 and the sun gear member 242 as reaction members. The planet carrier assembly member 246 is driven by the input shaft 64 through the torque transmitting mechanism 216. With the sun gear member 242 being stationary, the ring gear member 244 and therefore the output shaft 68 will be driven forward at an overdrive ratio determined only by the tooth ratio (N3) of the planetary gear set 208.

To establish the fifth forward ratio, the torque transmitting mechanisms 214 and 212 are interchanged to establish the sun gear member 220 as a reaction member. The ring gear member 222 and planet carrier assembly member 234 are driven forwardly at a speed determined by the tooth ratio of the planetary gear set 204 due to the stationary condition of the sun gear member 220. The sun gear members 236 and 242 will be driven reversely at a speed determined by the speed of the ring gear member 232 (unity) and the planet carrier assembly member 234 (reduced) and the tooth ratio of the planetary gear set 206. The ring gear member 244 and the output shaft 68 will be driven forwardly at an overdrive speed determined by the speed of the planet carrier assembly member 246 (unity) and the sun gear member 242 (reduced-reverse) and the tooth ratio of the planetary gear set 208. The overall fifth drive ratio (input/output) is determined by the tooth ratios (N1, N2, and N3) of all three planetary gear sets 204, 206, and 208.

The sixth forward ratio is established by the interchange of the torque transmitting mechanisms 212 and 210. This will cause the planet carrier assembly member 234 to be held stationary and become a reaction member. The ring gear member 232 is driven forwardly at the speed of the input shaft (unity) resulting in the sun gear member 236 and the sun gear member 242 being driven in reverse at 2.72 (N2 in FIG. 2) times the speed of the input shaft 64. The ring gear member 244 and the output shaft 68 are driven forwardly at an overdrive speed determined by the speed of the planet carrier assembly member 246 (unity) and the sun gear member 242 (overdrive-reverse) and the tooth ratio of the planetary gear set 208. The overall sixth drive ratio (input/output) is determined by the tooth ratios (N2, N3) of the planetary gear sets 206 and 208.

N1 in FIG. 6 is the tooth ratio of the ring gear member 222 to the sun gear member 220. N2 in FIG. 6 is the tooth ratio of the ring gear member 232 to the sun gear member 236. N3 in FIG. 6 is the tooth ratio of the ring gear member 244 to the sun gear member 242. It is evident from the truth table that each of the torque transmitting mechanisms 210, 212, 214, 216, and 218 are engaged in at least two of the drive ratios. The torque transmitting mechanism 216 is engaged during four consecutive forward drive ratios and the torque transmitting mechanism 218 is engaged during three consecutive forward drive ratios. All of the single step shift sequences in the forward ratios are single transition interchanges. All of the double step shift ($1^{st}$ to $3^{rd}$, $3^{rd}$ to $5^{th}$, $2^{nd}$ to $4^{th}$, etc.) sequences in the forward ratios are single transition interchanges. The single transition interchanges simplifies the controls and produces a pleasant ride for the operator. It should also be noted in FIG. 6 that the ratio steps become progressively smaller as the gear ratios are sequenced from first to fifth. The 5/6 step ratio is greater that the 4/5 step ratio.

Figure 7:
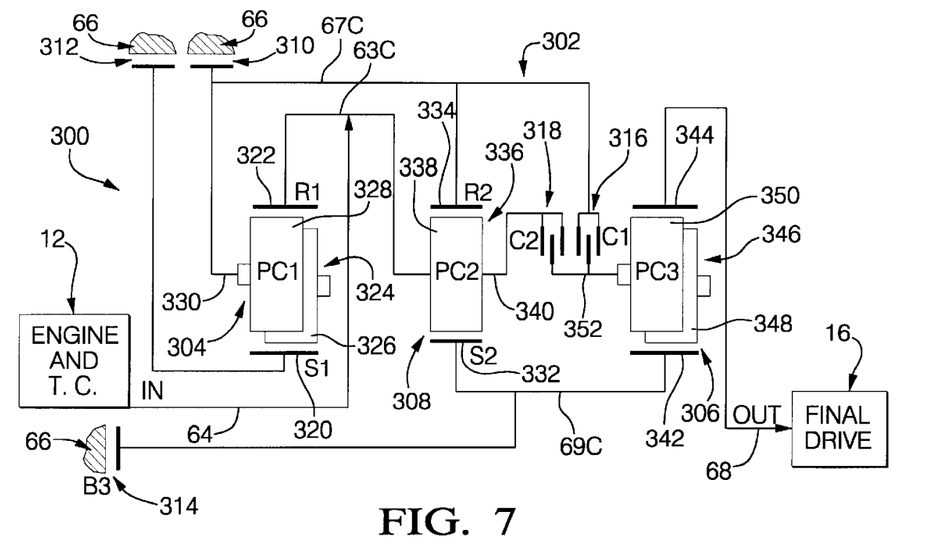
FIG. 7 is a schematic representation of still another powertrain incorporating the present invention.

The powertrain 300, shown in FIG. 7, includes the engine and torque converter 12, a planetary gear arrangement 302, and the final drive 16. The planetary gear arrangement 302 has two compound planetary gear sets 304 and 306, a simple planetary gear set 308, three stationary torque transmitting mechanisms 310, 312, and 314, and two rotating torque transmitting mechanisms 316 and 318. The torque transmitting mechanisms are engaged in combinations of two to provide six forward speeds and a reverse speed. The torque transmitting mechanism 312 may remain in engagement during a neutral condition to facilitate the forward/reverse interchange.

The planetary gear set 304 includes a sun gear member 320, a ring gear member 322, and a planet carrier assembly member 324 that has a plurality of intermeshing pinion gear members 326 and 328 rotatably disposed on a carrier 330 and meshing respectively with the sun gear member 320 and the ring gear member 322. The planetary gear set 308 includes a sun gear member 332, a ring gear member 334, and a planet carrier assembly member 336 that has a plurality of pinion gear members 338 rotatably mounted on a carrier 340 and meshing with both the sun gear member 332 and the ring gear member 334. The planetary gear set 306 includes a sun gear member 342, a ring gear member 344, and a planet carrier assembly member 346 having a plurality of intermeshing pinion gear members 348 and 350 rotatably mounted on a carrier 352 and meshing with the sun gear member 342 and the ring gear member 344, respectively.

The sun gear member 320 is operatively connected with the torque transmitting mechanism 312 which, when engaged, connects the sun gear member 320 with the transmission housing 66. The ring gear member 322 and the planet carrier assembly member 336 are continuously interconnected through a connection 63C and also continuously connected with the input shaft 64 which is operatively connected with the torque transmitting mechanism 318. The planet carrier assembly member 324 is continuously connected, through a connection 67C, with the ring gear member 334 and also operatively connected with the torque transmitting mechanism 316 and the torque transmitting mechanism 310 which, when engaged, connects the ring gear member 334 and the planet carrier assembly member 324 to the transmission housing 66. The sun gear member 332 and the sun gear member 342 are continuously interconnected, through a connection 69C, and both are operatively connected with the torque transmitting mechanism 314 which, when engaged, connects both sun gear members 332 and 342 to the transmission housing 66. The ring gear member 344 is continuously connected with the output shaft 68. The planet carrier assembly member 346 is operatively connected with the torque transmitting mechanism 316 which, when engaged, connects the planet carrier assembly member 346 with the ring gear member 334 and the planet carrier assembly member 324; and the planet carrier assembly member 346 is operatively connected with the torque transmitting mechanism 318 which, when engaged, connects the planet carrier assembly member 346 with the planet carrier assembly member 336, the ring gear member 322 and the input shaft 64.

To establish the reverse drive ratio, the torque transmitting mechanisms 312 and 318 are engaged. This establishes the sun gear member 320 as a reaction member and the planet carrier assembly member 346 as an input member. The planet carrier assembly member 336, the ring gear member 322, and the planet carrier assembly member 346 are driven at the speed of the input shaft (unity). The planet carrier assembly member 324 and the ring gear member 334 are driven forwardly at a speed determined by the tooth ratio (N1 in FIG. 8) of the planetary gear set 304. The sun gear member 332 and the sun gear member 342 are driven in reverse at a speed determined by the speed of the ring gear member 334, the planet carrier assembly member 336 and the tooth ratio (N2 in FIG. 8) of the planetary gear set 308. The ring gear member 344 and the output shaft 68 will rotate in reverse at a speed determined by the speed of the planet carrier assembly member 346, the sun gear member 342 and the tooth ratio (N3 in FIG. 8) of the planetary gear set 306. The reverse drive ratio is determined by the tooth ratios N1, N2, and N3) of all three of the planetary gear sets 304, 306, and 308.

Figure 8:
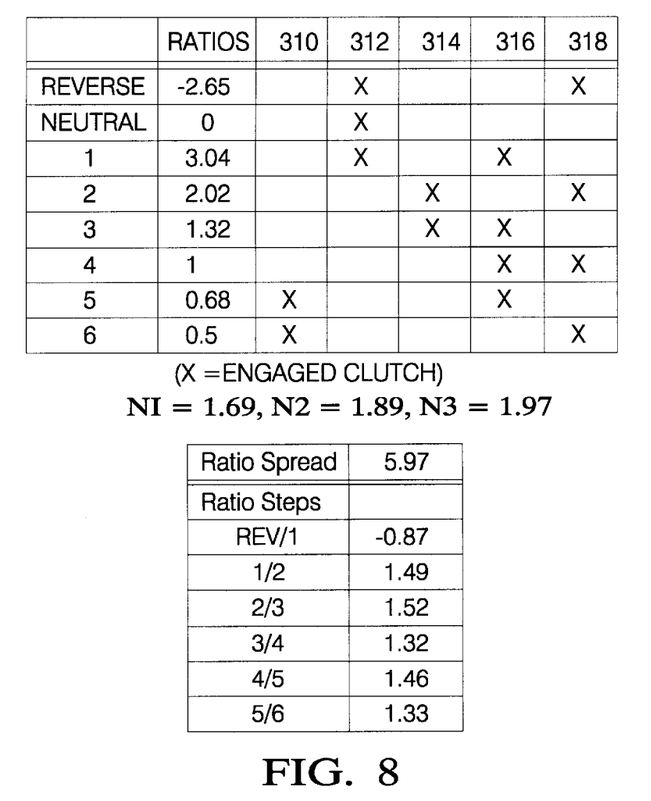
FIG. 8 is a truth table setting forth the interchange schedule for the torque transmitting mechanisms of the powertrain shown in FIG. 7.

To establish the first forward drive ratio, the torque transmitting mechanisms 312 and 316 are engaged. As previously mentioned, the torque transmitting mechanism 312 can remain engaged through the neutral condition. The planet carrier assembly member 324, ring gear member 334 and the planet carrier assembly member 346 are rotated forwardly at a speed determined by the speed of the ring gear member 322 (unity) and the tooth ratio of the planetary gear set 304. The sun gear members 332 and 342 are driven in reverse at a speed determined by the speed of the ring gear member 334, the planet carrier assembly member 336, and the tooth ratio of the planetary gear set 308. The ring gear member 344 and the output shaft 68 are driven forwardly at a speed determined by the speed of the sun gear member 342, the planet carrier assembly member 346 and the tooth ratio of the planetary gear set 306. The planet carrier assembly member 346 rotates forwardly at a faster relative speed during the first forward drive ratio than during the reverse drive ratio. The first forward drive ratio is determined by the tooth ratios (N1, N2, and N3) of all three planetary gear sets 304, 306, and 308.

To establish the second forward drive ratio, the torque transmitting mechanisms 312 and 316 are disengaged and the torque transmitting mechanisms 318 and 314 are substantially simultaneously engaged. This is a double transition shift. The sun gear members 332 and 342 are reaction members and the planet carrier assembly member 346 is connected with the input shaft 64 to become an input member. The ring gear member 344 and the output shaft 68 are driven forwardly at a speed determined by the speed of the planet carrier assembly member 346 and the tooth ratio (N3) of the planetary gear set 306.

To establish the third forward ratio, the torque transmitting mechanisms 318 and 316 are interchanged in a single transition shift. The sun gear members 332 and 342 remain as reaction members. The ring gear member 334 is driven forwardly at a speed determined by the speed of the planet carrier assembly member 336 (unity) and the tooth ratio of the planetary gear set 308. The ring gear member 344 is driven forwardly at a speed determined by the speed of the planet carrier assembly member 346 and the tooth ratio of the planetary gear set 306. The planet carrier assembly member 346 has a faster relative speed during the third forward drive ratio as compared with the second forward drive ratio. The third forward drive ratio is determined by the tooth ratios (N2, N3) of the planetary gear sets 308 and 306.

To establish the fourth forward drive ratio, the torque transmitting mechanisms 314 and 318 are interchanged in a single transition shift. The planet carrier assembly member 336 and the ring gear member 334 (torque transmitting mechanisms 318 and 316 provide the connection) are driven at the speed of the input shaft 64 and therefore, the sun gear members 332 and 342 rotate at the speed of the input shaft 64. The planet carrier assembly member 346 is driven at the speed of the input shaft through the torque transmitting mechanism 318 and therefore the output shaft 68 is driven at the speed of the input shaft 64. The fourth forward drive ratio is a direct drive.

To establish the fifth forward drive ratio, the torque transmitting mechanisms 318 and 310 are interchanged in a single transition shift. The ring gear member 334 and the planet carrier assembly member 346 become reaction members. The sun gear members 332 and 342 are driven forwardly at a speed determined by the speed of the planet carrier assembly member 336 and the tooth ratio of the planetary gear set 308. The ring gear member 344 is driven forwardly at an overdrive ratio determined by the speed of the sun gear member 342 and the tooth ratio of the planetary gear set 306. The fifth forward drive ratio is determined by the tooth ratios (N2, N3) of both planetary gear sets 308 and 306.

To establish the sixth forward drive ratio, the torque transmitting mechanisms 316 and 318 are interchanged in a single transition shift. The ring gear member 334 remains a reaction member and the planet carrier assembly member 346 becomes an input member driven at the speed of the input shaft 64. The sun gear members 332 and 342 are driven forwardly at a speed determined, as in the fifth forward drive ratio, by the speed of the planet carrier assembly member 336 and the tooth ratio of the planetary gear set 308. The ring gear member 344 and the output shaft 68 are driven at a speed determined by the speed of the planet carrier assembly member 346 (unity), the speed of the sun gear member 342 (overdrive) and the tooth ratio of the planetary gear set 306. The sixth forward drive ratio is determined by the tooth ratios (N2, N3) of both planetary gear sets 308 and 306. However, the planet carrier assembly member 346 is rotating relatively faster during the sixth forward speed ratio as compared to the fifth forward speed ratio.

N1 in FIG. 8 is the tooth ratio of the ring gear member 322 to the sun gear member 320. N2 in FIG. 8 is the tooth ratio of the ring gear member 334 to the sun gear member 332. N3 in FIG. 8 is the tooth ratio of the ring gear member 344 to the sun gear member 342. It is evident from the truth table that each of the torque transmitting mechanisms 310, 312, 314, 316, and 318 are each engaged in at least two of the drive ratios. The torque transmitting mechanism 316 is engaged during four forward drive ratios, three of which are consecutive, and the torque transmitting mechanism 218 is engaged during three forward drive ratios. Except for the $1^{st}/2^{nd}$ interchange, all of the single step shift sequences in the forward ratios are single transition interchanges. All of the double step shift ($1^{st}$ to $3^{rd}$, $3^{rd}$ to $5^{th}$, $2^{nd}$ to $4^{th}$, etc.) sequences in the forward ratios are single transition interchanges. It should also be noted in FIG. 8 that the ratio steps are substantially equal.

Figure 9:
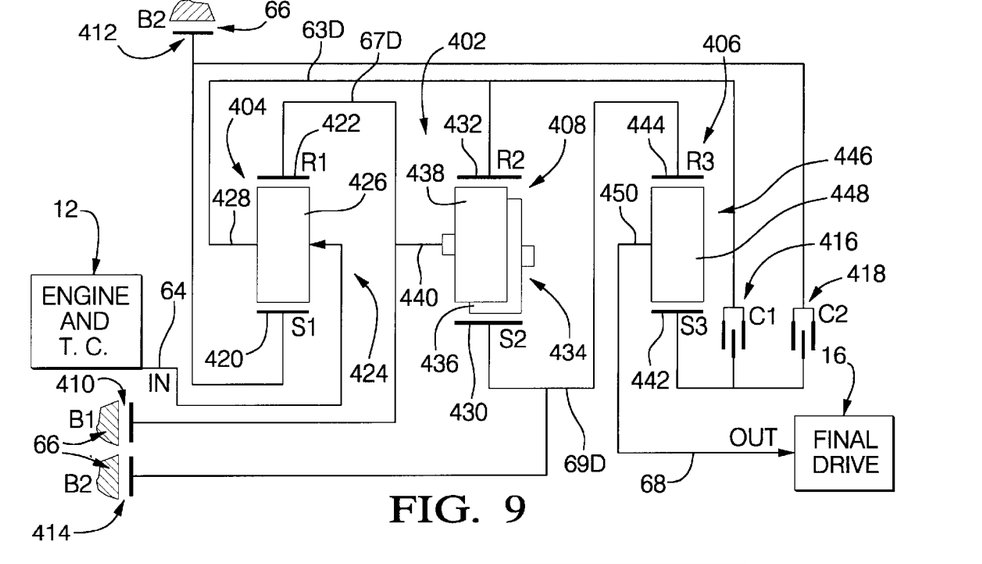
FIG. 9 is a schematic representation of a further powertrain incorporating the present invention.

The powertrain 400, shown in FIG. 9, includes the engine and torque converter 12, a planetary gear arrangement 402, and the final drive 16. The planetary gear arrangement 402 includes two simple planetary gear sets 404 and 406, a compound planetary gear set 408, three stationary torque transmitting mechanisms 410, 412, and 414, and two rotating torque transmitting mechanisms 416 and 418.

The planetary gear set 404 has a sun gear member 420, a ring gear member 422 and a planet carrier assembly member 424 that includes a plurality of pinion gear members 426 rotatably mounted on a carrier 428 and meshing with both the sun gear member 420 and the ring gear member 422. The planetary gear set 408 includes a sun gear member 430, a ring gear member 432, and a planet carrier assembly member 434 that has a plurality of intermeshing pinion gears 436 and 438 rotatably mounted on a carrier 440 and meshing with the sun gear member 430 and the ring gear member 432, respectively. The planetary gear set 406 has a sun gear member 442, a ring gear member 444, and a planet carrier assembly member 446 that includes a plurality of pinion gear members 448 rotatably mounted on a carrier 450 and meshing with both the sun gear member 442 and the ring gear member 444.

The sun gear member 420 is operatively connected with the torque transmitting mechanism 412 which, when engaged, connects the sun gear member 420 with the transmission housing 66. The sun gear member 420 is also operatively connected with the torque transmitting mechanism 418 which, when engaged, interconnects the sun gear members 420 and 442 and, if engaged simultaneously with the torque transmitting mechanism 421, connects both sun gear members 420 and 442 with the transmission housing. The ring gear member 422 and the planet carrier assembly member 434 are continuously interconnected, through a connection 67D, and both are operatively connected with the torque transmitting mechanism 410 which, when engaged, connects the ring gear member 422 and planet carrier assembly member 434 to the transmission housing 66. The planet carrier assembly member 424 and the ring gear member 432 are both continuously interconnected through a connection 63D which is also continuously connected to the input shaft 64 and operatively connected with the torque transmitting mechanism 416 which, when engaged, connects the sun gear member 442 with the input shaft 64. The sun gear member 430 and the ring gear member 444 are continuously interconnected through a connection 69D which is also operatively connected with the torque transmitting mechanism 414 which, when engaged, connects the sun gear member 430 and the ring gear member 444 with the transmission housing 66. The planet carrier assembly member 446 is continuously connected with the output shaft 68.

The torque transmitting mechanisms 410, 412, 414, 416, and 418 are engage in combinations of two to provide the establishment of six forward drive ratios and one reverse drive ratio. The torque transmitting mechanism 414 may be engaged during a neutral condition which will simplify the forward/reverse interchange.

Figure 10:
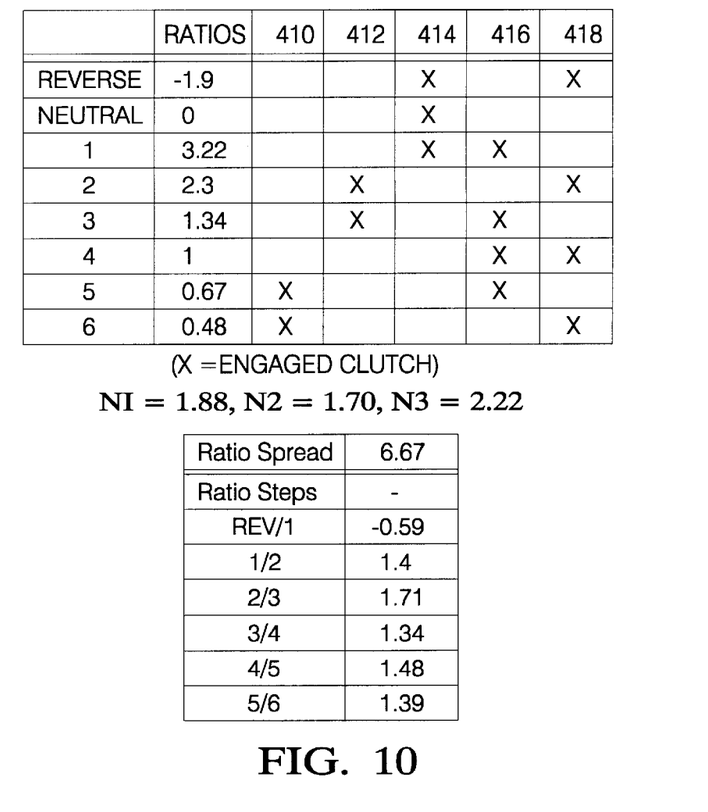
FIG. 10 is a truth table setting forth the interchange schedule for the torque transmitting mechanisms of the powertrain shown in FIG. 9.

The reverse drive ratio is established with the engagement of the torque transmitting mechanisms 414 and 418. This action interconnects the sun gear members 420 and 442 and grounds the ring gear member 444 and the sun gear member 430. In the reverse drive ratio, the planet carrier assembly member 434 and ring gear member 422 are driven forwardly by the ring gear member 432 at a speed determined by the speed of the ring gear member 432 (unity) and the tooth ratio of the planetary gear set 408. The sun gear members 420 and 442 are driven in reverse at a speed determined by the speed of planet carrier assembly member 424 (unity) and ring gear member 422 and the tooth ratio of the planetary gear set 404. The planet carrier assembly member 446 is driven in reverse at a speed determined by the speed of the sun gear member 442 and the tooth ratio of the planetary gear set 406. The reverse drive ratio is determined by the tooth ratios (N1, N2, and N3) of all three of the planetary gear sets 404, 406, and 408.

The first forward drive ratio is established with the engagement of the torque transmitting mechanisms 414 and 416. As previously noted, the torque transmitting mechanism 414 can be engaged during the neutral condition. The ring gear member 444 is a reaction member and the sun gear member 442 is an input member during this ratio. The planet carrier assembly member 446 and the output shaft 68 are driven forwardly at a reduced speed, relative to the input shaft 64, that is determined by the speed of the sun gear member 442 (unity) and the tooth ratio of the planetary gear set 406. Thus, the first forward drive ratio is determined only by the tooth ratio (N3) of the planetary gear set 406.

The second forward drive ratio is established with the disengagement of the torque transmitting mechanisms 414 and 416 and the substantially simultaneous engagement of the torque transmitting mechanisms 412 and 418. The torque transmitting mechanism 418 interconnects the sun gear members 442 and 420 and the torque transmitting mechanism 412 connects them to ground. The ring gear member 422 and the planet carrier assembly member 434 are driven forwardly at a speed determined by the speed of the planet carrier assembly member 424 (unity) and the tooth ratio of the planetary gear set 404. The sun gear member 430 and the ring gear member 444 are driven forwardly at a speed determined by the speed of the planet carrier assembly member 434, the speed of the ring gear member 432, and the tooth ratio of the planetary gear set 408. The planet carrier assembly member 446 and the output shaft 68 are driven forwardly at a reduced speed, relative to the input shaft 64, that is determined by the speed of the ring gear member 444 and the tooth ratio of the planetary gear set 406. Thus the second forward speed ratio is determined by the tooth ratios (N1, N2, and N3) of all three planetary gear sets 404, 406 and 408.

The third forward drive ratio is established with the interchange of the torque transmitting mechanisms 418 and 416. This is a single transition interchange. The sun gear member 420 remains connected to ground and the sun gear member 442 becomes connected with the input shaft 64. The ring gear member 422 and the planet carrier assembly member 434 are driven forwardly at a speed determined by the speed of the planet carrier assembly member 424 (unity) and the tooth ratio of the planetary gear set 404. The sun gear member 430 and the ring gear member 444 are driven forwardly at a speed determined by the speed of the ring gear member 432 (unity), the speed of the planet carrier assembly member 434, and the tooth ratio of the planetary gear set 408. The planet carrier assembly member 446 and the output shaft 68 are driven forwardly at a reduced speed, relative to the input shaft 64, that is determined by the speed of the sun gear member 442 (unity), the speed of the ring gear member 444, and the tooth ratio of the planetary gear set 406. The third forward drive ratio is determined by the tooth ratios (N1, N2, and N3) of all three planetary gear sets 404, 406 and 408.

The fourth forward drive ratio is established with the interchange of the torque transmitting mechanisms 412 and 418. This connects the sun gear member 420 with the input shaft which through cooperation with the planet carrier assembly member 426 rotates the planetary gear set 404 at the speed of the input shaft 64. The planetary gear sets 406 and 408 are also driven at the speed of the input shaft due to the interconnections with each other and with the planetary gear set 404. The fourth forward ratio is a direct drive ratio (one to one).

The fifth forward drive ratio is established with the interchange of the torque transmitting mechanisms 418 and 410 which will connect the ring gear member 422 and planet carrier assembly member 434 to ground and will interconnect the sun gear member 442 and the input shaft 64. The sun gear member 430 and the ring gear member 444 are driven forwardly at a speed determined by the speed of the ring gear member 432 (unity) and the tooth ratio of the planetary gear set 408. The planet carrier assembly member 446 and the output shaft 68 are driven forwardly at a speed determined by the speed of the sun gear member 442 (unity), the speed of the ring gear member 444, and the tooth ratio of the planetary gear set 406. The fifth forward drive ratio is an overdrive ratio that is determined by the tooth ratios (N2, N3) of the planetary gear sets 408 and 406.

The sixth forward drive ratio is established with the interchange of the torque transmitting mechanisms 416 and 418. The ring gear member 422 and the planet carrier assembly member 434 remain as reaction members and the sun gear member 442 is connected with the sun gear member 420. The sun gear member 420 is rotated forwardly at a speed determined by the speed of the planet carrier assembly member 424 (unity) and the tooth ratio of the planetary gear set 404. The speed of the sun gear member 420 is faster than the speed of the planet carrier assembly member 424. The sun gear member 430 and the ring gear member 444 are driven forwardly at a speed determined by the speed of the ring gear member 432 (unity) and the tooth ratio of the planetary gear set 408. The planet carrier assembly member 446 and the output shaft 68 are driven forwardly at a speed determined by the speed of the sun gear member 442, the speed of the ring gear member 444, and the tooth ratio of the planetary gear set 406. The sixth forward ratio is an overdrive ratio that is determined by the tooth ratios (N1, N2, and N3) of all three planetary gear sets 404, 406, and 408. During the sixth forward ratio, the ring gear member 444 is rotated at the same relative speed (compared with the input shaft 64) and the sun gear member 442 is rotated at a faster relative speed than is present during the fifth forward drive ratio.

N1 in FIG. 10 is the tooth ratio of the ring gear member 422 to the sun gear member 420. N2 in FIG. 10 is the tooth ratio of the ring gear member 432 to the sun gear member 430. N3 in FIG. 10 is the tooth ratio of the ring gear member 444 to the sun gear member 442. It is evident from the truth table that each of the torque transmitting mechanisms 410, 412, 414, 416, and 418 are each engaged in at least two of the drive ratios. The torque transmitting mechanism 416 is engaged during four forward drive ratios, three of which are consecutive, and the torque transmitting mechanism 418 is engaged during three forward drive ratios. Except for the $1^{st}/2^{nd}$ interchange, all of the single step shift sequences in the forward ratios are single transition interchanges. All of the double step shift ($1^{st}$ to $3^{rd}$, $3^{rd}$ to $5^{th}$, $2^{nd}$ to $4^{th}$, etc.) sequences in the forward ratios are single transition interchanges. It should also be noted in FIG. 10 that the ratio steps are substantially equal with the exception of the 2/3 ratio step.

What is claimed is:

1. A powertrain having a multi-speed transmission, said transmission comprising:

an input shaft connected to deliver power to said transmission;

an output shaft connected to deliver power from said transmission;

a planetary gear arrangement comprising first, second and third planetary gear sets, first, second and third stationary torque transmitting mechanisms, and first and second rotatable torque transmitting mechanisms, each planetary gear set having three rotatable members, a first connection continuously interconnecting a first member of said first planetary gear set, said input shaft, and a first member of said second planetary gear set, a second connection continuously interconnecting a second member of said first planetary gear set and a second member of said second planetary gear set, a third member of said first planetary gear set being operatively connected with said first stationary torque transmitting mechanism, a third connection continuously interconnecting a third member of said second planetary gear set and a first member of said third planetary gear set, said second stationary torque transmitting mechanism being operatively connected with said third connection, said third stationary torque transmitting mechanism being operatively connected with one of said second connection and a second member of said third planetary gear set, said first rotatable torque transmitting mechanism being operatively connectable between said first connection and said second member of said third planetary gear set, said second rotatable torque transmitting mechanism being operatively connectable between a member of said first planetary gear set and one of said second member of said third planetary gear set and said output shaft, and said third member of said third planetary gear set being continuously connected with said output shaft; and said torque transmitting mechanisms being selectively operated in combinations of two to establish six forward drive ratios and one reverse drive ratio between said input shaft and said output shaft.

2. The transmission defined in claim 1 wherein:

one of said rotatable torque transmitting mechanisms is engaged during four of said forward drive ratios, the other of said rotatable torque transmitting mechanisms is engaged during three of said forward drive ratios, and both of said rotatable torque transmitting mechanisms being simultaneously engaged during only one of said forward drive ratios; and two of said stationary torque transmitting mechanisms each being selectively engaged during two of said forward drive ratios, and the third of said stationary torque transmitting mechanisms being selectively engaged during at least one forward drive ratio and one reverse drive ratio.

3. The transmission defined in claim 1 wherein:

said first rotatable torque transmitting mechanism being engaged during three consecutive forward drive ratios, and said second rotatable torque transmitting mechanism being engaged during three of said forward drive ratios, only one of which coincides with the three consecutive forward drive ratios.

4. The transmission defined in claim 1 wherein:

said third member of said first planetary gear set is a sun gear member.

5. The transmission defined in claim 1 further wherein:

said first, second, and third members of said first planetary gear set are a ring gear member, a planet carrier assembly member, and a sun gear member, respectively;

said first, second, and third members of said second planetary gear set are a sun gear member, a planet carrier assembly member, and a ring gear member, respectively; and said first, second, and third members of said third planetary gear set are a sun gear member, planet carrier assembly member, and a ring gear member, respectively.

6. The transmission defined in claim 1 further wherein:

said first, second, and third members of said first planetary gear set are a ring gear member, a planet carrier assembly member, and a sun gear member, respectively;

said first, second, and third members of said second planetary gear set are a planet carrier assembly member, a ring gear member and a sun gear member, respectively; and said first, second, and third members of said third planetary gear set are a planet carrier assembly member, a ring gear member, and a sun gear member, respectively.

7. The invention defined in claim 1 further comprising:

said first, second, and third members of said first planetary gear set are a planet carrier assembly member, a ring gear member and a sun gear member, respectively;

said first, second, and third members of said second planetary gear set are a ring gear member, a planet carrier assembly member, and a sun gear member, respectively; and said first, second, and third members of said third planetary gear set are a sun gear member, a planet carrier assembly member, and a ring gear member, respectively.

8. The invention defined in claim 1 further comprising:

said first, second, and third members of said first planetary gear set are a ring gear member, a planet carrier assembly member, and a sun gear member, respectively;

said first, second, and third members of said second planetary gear set are a planet carrier assembly member, a ring gear member, and a sun gear member, respectively; and said first, second, and third members of said third planetary gear set are a sun gear member, a planet carrier assembly member, and a ring gear member, respectively.

9. The invention defined in claim 1 further comprising:
said first, second, and third members of said first planetary gear set are a planet carrier assembly member, a ring gear member, and a sun gear member, respectively;
said first, second, and third members of said second planetary gear set are a ring gear member, a planet carrier assembly member, and a sun gear member, respectively;
said first, second, and third members of said third planetary gear set are a ring gear member, a sun gear member, and a planet carrier assembly member, respectively.

10. A powertrain having a power source and a multi-speed transmission, said transmission comprising:
a transmission housing;
an input shaft for delivering power from said source to said transmission;
an output shaft for delivering power from said transmission;
first, second, and third planetary gear sets each having first, second, and third rotatable members;
first, second, and third selectively operable brakes each being operatively connected with said transmission housing;
first and second selectively operable clutches;
a first continuous connection for interconnecting said first rotatable members of said first and second planetary gear sets;
a second continuous connection for interconnecting said second rotatable members of said first and second planetary gear sets;
a third continuous connection for interconnecting said third member of said second planetary gear set and said first member of said third planetary gear set;
said first continuous connection being continuously connected with said input shaft, and said first clutch being selectively connectable between said first fixed interconnection and the second member of said third planetary gear set;
said third member of said third planetary gear set being continuously connected with said output shaft;
said second clutch being selectively connectable between one member of said first planetary gear set and either said second member of said third planetary gear set or said output shaft;
said first brake being operatively connected with said third member of said first planetary gear set;
said second brake being operatively connected with said third fixed connection;
said third brake being operatively connected with either said second fixed connection or said second member of said third planetary gear set; and
said three brakes and said two clutches being selectively engaged in combinations of two to establish a plurality of forward drive ratios and a reverse drive ratio between said input shaft and said output shaft.

11. The transmission defined in claim 10 further comprising:
each of said clutches being engaged during the establishment of at least three of said forward drive ratios, and each of said brakes being engaged during at least two of said forward and reverse drive ratios.

12. The transmission defined in claim 10 further comprising:
one of said clutches being engaged during four of said forward drive ratios, the other of said clutches being engaged during three of said forward drive ratios, and both of said clutches being simultaneously engaged during only one of said forward drive ratios; and
two of said brakes each being selectively engaged during two of said forward drive ratios, and the third of said brakes being selectively engaged during one of said forward drive ratios and one reverse ratio.

13. The transmission defined in claim 12 further wherein:
said first, second, and third members of said first planetary gear set are a ring gear member, a planet carrier assembly member, and a sun gear member, respectively;
said first, second, and third members of said second planetary gear set are a sun gear member, a planet carrier assembly member, and a ring gear member, respectively; and
said first, second, and third members of said third planetary gear set are a sun gear member, planet carrier assembly member, and a ring gear member, respectively.

14. The transmission defined in claim 12 further wherein:
said first, second, and third members of said first planetary gear set are a ring gear member, a planet carrier assembly member, and a sun gear member, respectively;
said first, second, and third members of said second planetary gear set are a planet carrier assembly member, a ring gear member and a sun gear member, respectively; and
said first, second, and third members of said third planetary gear set are a planet carrier assembly member, a ring gear member, and a sun gear member, respectively.

15. The invention defined in claim 10 further comprising:
said first, second, and third members of said first planetary gear set are a planet carrier assembly member, a ring gear member and a sun gear member, respectively;
said first, second, and third members of said second planetary gear set are a ring gear member, a planet carrier assembly member, and a sun gear member, respectively; and
said first, second, and third members of said third planetary gear set are a sun gear member, a planet carrier assembly member, and a ring gear member, respectively.

16. The invention defined in claim 10 further comprising:
said first, second, and third members of said first planetary gear set are a ring gear member, a planet carrier assembly member, and a sun gear member, respectively;
said first, second, and third members of said second planetary gear set are a planet carrier assembly member, a ring gear member, and a sun gear member, respectively; and
said first, second, and third members of said third planetary gear set are a sun gear member, a planet carrier assembly member, and a ring gear member, respectively.

17. The invention defined in claim 10 further comprising:
said first, second, and third members of said first planetary gear set are a planet carrier assembly member, a ring gear member, and a sun gear member, respectively;
said first, second, and third members of said second planetary gear set are a ring gear member, a planet carrier assembly member, and a sun gear member, respectively;
said first, second, and third members of said third planetary gear set are a ring gear member, a sun gear member, and a planet carrier assembly member, respectively.

* * * * *